United States Patent [19]

Currie et al.

[11] Patent Number: 4,917,842

[45] Date of Patent: Apr. 17, 1990

[54] PROCESS OF MAKING CERAMICS

[75] Inventors: Janie K. Currie, Russell; Roman Loza, Solon; Eleanor J. Fendler, Hudson, all of Ohio

[73] Assignee: The Standard Oil Company, Cleveland, Ohio

[21] Appl. No.: 155,659

[22] Filed: Feb. 12, 1988

[51] Int. Cl.⁴ ............................................. C04B 33/28
[52] U.S. Cl. ........................................ 264/56; 264/63; 264/86; 264/166; 419/40; 501/1
[58] Field of Search ................. 264/56, 86, 166, 63; 501/1; 419/40

[56] References Cited

U.S. PATENT DOCUMENTS

| | | | |
|---|---|---|---|
| 457,672 | 8/1886 | Stoddart | 252/102 |
| 3,367,871 | 2/1968 | Mueller et al. | 252/62 |
| 3,505,243 | 2/1965 | Steinberg et al. | 252/353 |
| 3,594,144 | 7/1971 | Acello | 65/43 |
| 3,615,811 | 10/1971 | Barrett | 106/306 |
| 3,663,284 | 5/1972 | Stancioff | 106/300 |
| 3,717,487 | 2/1973 | Hurley et al. | 106/48 |
| 3,736,165 | 5/1973 | Sawyer | 106/288 |
| 3,738,938 | 6/1973 | Barrett | 252/188.3 |
| 3,822,312 | 7/1974 | Sato et al. | 252/527 |
| 3,829,320 | 8/1974 | Stanbridge | 106/84 |
| 3,849,348 | 11/1974 | Hewitt | 252/547 |
| 3,862,045 | 1/1975 | Sato et al. | 252/8.75 |
| 4,046,732 | 9/1977 | Infante | 260/31.2 R |
| 4,143,180 | 3/1979 | White | 427/145 |
| 4,166,048 | 8/1979 | Nishimura et al. | 252/546 |
| 4,226,843 | 10/1980 | Watanabe et al. | 423/594 |
| 4,264,640 | 4/1981 | Infante | 427/264 |
| 4,267,065 | 5/1981 | Johnson, Jr. et al. | 252/62.62 |
| 4,301,020 | 11/1981 | Johnson, Jr. et al. | 252/62.62 |
| 4,318,995 | 3/1982 | Rhodes et al. | 501/104 |
| 4,370,169 | 1/1983 | Graham | 106/267 |
| 4,414,337 | 11/1983 | Ichikawa et al. | 501/103 |
| 4,486,328 | 12/1984 | Knott et al. | 252/117 |
| 4,540,677 | 9/1985 | Enomoto et al. | 501/151 |
| 4,541,855 | 9/1985 | Scherer | 65/165 |
| 4,548,733 | 10/1985 | Vincent | 252/310 |
| 4,552,680 | 11/1985 | Hartman et al. | 252/102 |
| 4,554,098 | 11/1985 | Klisch et al. | 252/547 |
| 4,555,360 | 11/1985 | Bissett et al. | 252/541 |
| 4,569,920 | 2/1986 | Smith-Johannsen | 264/86 |
| 4,587,068 | 5/1986 | Borase | 264/86 |
| 4,600,526 | 7/1986 | Gallot et al. | 252/299.01 |
| 4,622,070 | 11/1986 | Sakurai et al. | 106/38.22 |
| 4,638,029 | 1/1987 | Meschke et al. | 524/430 |

Primary Examiner—James Derrington
Attorney, Agent, or Firm—Larry W. Evans; David J. Untener; Michael F. Esposito

[57] ABSTRACT

A slip or casting composition useful in molding or sheet casting comprising:

a mixture of inorganic particulate material, an organic solvent and a dispersant for said particulate material having the structure set forth below:

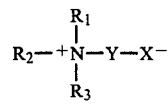

where
$R_1$, $R_2$, $R_3$ are linear or branched hydrocarbon chains, where no more than one of the R Groups is $CH_3$ and the remaining R groups are each at least 6 to 30 carbon atoms long;
Y is selected from the group consisting of $(CH_2)_n$ where n=1 to 10 and

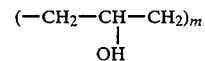

where m=1 to 5; and
X is selected from the group consisting of $COO-$, $SO_3-$, $PO_3-$.

3 Claims, 6 Drawing Sheets

SEDIMENTATION RATE v. "ZT" CONCENTRATION
"ZT"-I DISPERSION OF SiC IN TOLUENE

FINAL SEDIMENTATION VOLUMES OF DISPERSED SiC IN TOLUENE WITH THE ADDITION OF WATER

FIG. 6

PROCESS OF MAKING CERAMICS

BACKGROUND OF THE INVENTION

The present invention is related to an improvement in ceramic slip and tape casting compositions. In particular, the present invention is directed to ceramic casting compositions which utilize organic solvents. More particularly, the present invention is directed to the use of a particular class of dispersing agents for the inorganic casting compositions.

The following factors must be examined to determine if a good casting composition has been formed: viscosity; settling rate; sensitivity to mold conditions; release properties; shrinkage during drying; drain properties; strength of cast wear; casting rate; freedom from foaming; and finally, low evaporation rate of vehicle. The characteristics of a good casting composition are: (1) the slip must pour easily and fill all the details of the mold and should not exhibit significant yield point or pronounced dilatency or thixotropy; (2) the particles in the casting composition should not settle too quickly to the bottom otherwise the casting composition or casted product will have tapered walls and thick bottoms and the final fired ceramic part will have an excessive number of flaws or defects; (3) the casting composition must release from the mold fairly easy and should not shrink to excessive amounts during drying; (4) the strength of the cast object prior to firing must be sufficient to allow handling, trimming or further shaping of the cast article; (5) the rate of casting when utilizing the composition should be such as to be consistent with reasonable production rates and good properties; (6) the casting composition should not produce an excessive amount of foam which would result in the entrapment of air bubbles in the prefired cast object; and (7) the solvent used for the casting composition should have a relatively low evaporation rate so that a dry film does not form on the exposed surface of the cast composition.

Typically, prior casting compositions containing organic solvents have used polymers and copolymers of natural or synthetic materials as the dispersing agents Examples of these types of materials include fish oil, a cross-linked fatty acid triglyceride, corn oil, an unsaturated fatty acid glyceride and LB 2155 (a polyisobutenyl succinimide) produced by Lubrizol Corp.. While all these materials produce adequate organic casting compositions, there is substantial room for improvement. It is the object of the present invention to provide improved casting or slip composition utilizing a unique dispersing agent.

SUMMARY OF THE INVENTION

It is the primary object of the present invention to provide a casting composition suitable for use in molding or tape casting.

It is a further object of the present invention to provide a method of molding utilizing the casting composition of the present invention.

Additional objects and advantages of the invention will be set forth in part in the description which follows and in part will be obvious from the description, or may be learned by the practice of the invention. The objects and advantages of the invention may be realized and attained by means of the instrumentalities and combinations particularly pointed out in the appended claims.

To achieve the foregoing objects and in accordance with the purpose of the present invention as embodied and broadly described herein, the casting composition of the present invention comprises a mixture of a powdered inorganic material, an organic solvent or and a dispersing agent having the structure characterized by the formula set forth below:

where $R_1$, $R_2$, $R_3$ are linear or branched hydrocarbon chains and alkylaryl, and not more than one of the R Groups is $CH_3$ and the remaining R groups are each at least 6 to 30 carbon atoms long;

Y is selected from the group consisting of $(CH_2)_n$ where n=1 to 10 and where m=1 to 5; and X is selected from the group consisting of $COO^-$, $SO_3^-$, $PO_3^=$.

In another aspect of the present invention as broadly described and embodied herein, the process of the present invention comprises forming a ceramic article by mixing an inorganic powdered material with an organic solvent in the presence of a dispersing agent having the formula described above to form a casting composition, applying the casting composition to a suitable substrate, drying the casting composition for a time sufficient to remove the organic solvent and firing the dried composition to produce the finished ceramic product.

The casting composition and process of the present invention provides a ceramic article which has increased density and compaction when compared to prior art ceramic articles. In addition, the casting composition of the present invention is substantially insensitive to water at least within the operating ranges normally associated with processes utilizing casting compositions. That is, the casting composition provides good dispersions of the inorganic particulate material even if water is present in the composition or starting material. In the past, typical organic casting composition could not tolerate any significant amount of water because it would lead immediately to flocculation and/or precipitation of the dispersed inorganic particles and loss of favored rheology (i.e. flow properties). The dispersant of the present invention while not being highly water soluble provides that the organic dispersed casting composition can tolerate relatively high water content. For example, casting compositions prepared with the dispersing agent of the present invention were able to tolerate up to 20 wt. % water without any adverse effects on the composition. This means that the casting composition of the present invention can tolerate water as an impurity and that no special handling is necessary during the casting operation.

BRIEF DESCRIPTION OF DRAWINGS

The accompanying drawings, which are incorporated in and form a part of the specification, illustrate an embodiment of the present invention and together with the description serve to explain the principles of the invention.

In the drawings.

Reference will now be made in detail to the present preferred embodiments of the invention.

DETAILED DESCRIPTION OF THE INVENTION

The casting composition of the present invention comprises a mixture of an inorganic particulate material, an organic solvent or vehicle, and a dispersant characterized by the structure set forth below:

$$R_2-\overset{R_1}{\underset{R_3}{\overset{|}{\text{+N}}}}-Y-X^-$$

where $R_1$, $R_2$, $R_3$ are linear or branched hydrocarbon chains, and not more than one of the R Groups is $CH_3$ and the remaining R groups are each at least 6 to 30 carbon atoms long;

Y is selected from the group consisting of $(CH_2)_n$ where $n = 1$ to 10 and $$(-CH_2-\underset{OH}{\overset{|}{CH}}-CH_2)_m$$

where $m = 1$ to 5; and

X is selected from the group consisting of $COO^-$, $SO_3^-$, $PO_3^{50}$.

The casting composition of the present invention is useful in the formation of structural and electronic ceramics.

The inorganic particulate material suitable for use in the casting composition of the present invention may comprise any conventional ceramic or inorganic material. Typical examples of suitable inorganic particulate materials useful in ceramic applications are metal oxides such as aluminum oxide, magnesium oxide, calcium oxide, zirconium oxide, etc.; intermetallic compounds such as silicon carbide, titanium carbide, titanium nitride, aluminum nitride, zirconium carbide, etc.; cermets such as tungsten carbide-cobalt, etc.; metallics such as tungsten and molybdenum and slip-casting fluorides such as calcium fluoride. The inorganic particulate material should be compatible with the organic solvent utilized to form the casting composition. Typically, the weight percent of the inorganic particulate material is between about 5 to 80, preferably 5 to 50, especially preferred being 5 to 40. However, it should be understood that these ranges are illustrative only and it is envisioned that particulate material outside these ranges, in particular, lower amounts would be suitable in the practice of the present invention.

The size of the particles constituting the solid phase may vary over a wide range depending on the density of the inorganic material and the desired characteristics of the fired article. However, the particles should be in the colloidal size range. High density materials require submicron particles to avoid settling. Experience has shown that oxide bodies to be fired to vitrification should consist of particles smaller than 20 micrometers in diameter with at least half the particles being between 1 and 5 micrometers. Extremely fine particles such as those smaller than 1 micrometer may cause problems because they require large amounts of liquids to provide a usable slip for casting compositions. In the practice of the present invention, the preferred particle size for the inorganic particles is between 0.01 and 20 microns, most preferably, 0.5 to 10 microns.

The organic solvent used to suspend the inorganic particles in the casting composition should have a relatively low vapor pressure, be compatible with the suspended particulate material, be cheap, of low viscosity and have an ability to dissolve the dispersing agent. Typical organic solvents for the casting composition of the present invention comprise acetone, ethyl alcohol, benzene, butanol, ethanol, isopropanol, methylisobutylketone, toluene, trichloroethylene and xylene. In the preferred embodiment of the present invention, the organic solvent utilized is toluene.

The dispersing agent of the present invention is generally classified as a zwitterion and must have the formula as set forth above. This zwitterionic dispersing agent has been shown to provide casting compositions which result in a green unfired ceramic composition which is tightly packed and has a high density. Another advantage is that the dispersing agents control settling time for the casting solution. Finally, the zwitterionic dispersing agent of the present invention provides the casting composition with a high tolerance to impurities such as water. The dispersing agents of the present invention are low molecular weight monomers consisting of a polar head group that contains at least one positive and one negative charge in a branched hydrocarbon tail. Unlike the polymer dispersing agents known previously, they do not contain repeating functional units and provide a casting dispersion which provides good casting compositions which upon sedimentation gives a product having a high density leading to a ceramic with increased material properties. Specific examples of suitable dispersants for the present invention include:

$$(C_8)(C_{10})N^+(Me)CH_2\underset{OH}{\overset{|}{CH}}-CH_2\ SO_3^-\ \text{and}$$

$$(C_{10})_2N^+(Me)CH_2-COO-$$

The weight percent of dispersant with respect to solids may range from 0.5 to 10, preferably 1 to 8. Most preferably the range is Z to 5. Of course, it should be understood that the particular preferred wt. percent of dispersant in the casting composition will be dependent on the final utility of the resulting cast product and can be determined by routine experimentation by one having ordinary skill in the art.

Optionally, conventional binders and anti-foaming agents may be added to the casting composition of the present invention. Typically, these types of binders include polyvinyl alcohol, ureaformadehyde, carboxymethylcellusose, ethylsilicate, etc. Typical anti-foaming agents include small amounts of octyl alcohol.

The casting composition of the present invention is suitable in any conventional molding or casting operation. It is envisioned that it shall find significant utility in the Doctor Blade process of forming ceramic materials. Typically, the Doctor Blade process comprises suspending a finely divided inorganic powders in a nonaqueous liquid system comprising an organic solvent, binder and dispersing agent to form a slurry that is cast onto a moving carrier surface. The slurry passes beneath a knife edge or blade that levels or "doctors" the slurry into a layer of controlled thickness and width as the carrier surface advances along a supporting table. When the solvent evaporates, the fine, solid particles coalesce into a relatively dense, flexible sheet that can be stored on take-up reels or stripped from the carrier in a continuous sequence. The terms "tape process", "knife coating", "tape casting" and "sheet casting" have been used synonymously with the doctor blading in referring to the process of forming thin, relatively large area sheets of ceramic compositions.

This particular process has been established as a useful method for manufacturing of a variety of electronic ceramics. Typical applications include the preparation of capacitors, peizioelectric devices, ferrite memories, electrically insulating substrates for thick and thin film circuitry and substrates for catalysts. It is generally advantageous for preparing relatively large area, thin sheets but uniform in high unfired densities. The usual range and the fired thickness of the parts made by this process are from 0.001 to 0.045 inches. Complex shapes with intricate hole patterns can be formed directly by punching or stamping the parts from the as-cast sheet.

The average particle size of the inorganic powder in the casting composition is approximately .4 micrometers. The particle range is between 0.1 to 3 micrometers. Typical organic solvents used are alcohols and toluene. In practice the process comprises casting the slip onto a carrier films which may be selected from the common materials such as Teflon, Milar, cellophane and cellulose acetate. Carrier films are selected to provide a clean, smooth, impervious, insoluble surface. The dried slip should not adhere too strongly to the carrier because this would cause difficulties in stripping the tape (i.e. dried slip) from the carrier. However, the slurry should have sufficient adherence or interaction with the carrier during drying to effectively control shrinkage during drying causing it to occur essentially in the thickness direction perpendicular to the tape carrier. It has been suggested that to prevent excessive sticking of the slurry to the tape that plasticizers be added to the slurry composition. However, these materials do not form a part of this invention and are readily selected by anyone having ordinary skill in the art.

In a preferred embodiment of the process of the present invention, a casting composition/slip comprising the inorganic particulate material, an organic solvent and a dispersant having the formula described above is mixed in a vessel. The slurry is then transferred from the vessel to a carrier sheet which passes under a doctor blade. The doctor blade levels the casting composition on the sheet as it passes thereby. The organic solvent in the slurry is evaporated leaving a pre-fired green ceramic coating on the carrier sheet. The resulting dried pre-fired ceramic can then be fired at a high temperature (i.e. greater than 500° C.) to produce the finished ceramic product.

The following examples are set forth as illustrative of the preferred embodiments of the present invention.

EXAMPLES

Materials:
colloidal SiC, particle size in micron range
colloidal AlN, particle size in micron range
reagent grade toluene
corn oil, fish oil, LB-2155 (manufactured by Lubrizol)
ZT-1 TM, ZT-2 TM, ZT-3 TM dispersing agent of the present invention
10cc graduated cylinders, acid-washed and oven dried
no. 0.00 black rubber stoppers, acetone-washed and air dried.

General Procedure

In each of the specific examples which follows, the casting or slip composition to be tested was prepared as follows. The fully prepared dispersant (e.g. $C_8C_{10}N^+(Me)CH_2OHCHCH_2SO_3^-$) was dissolved in 7cc of toluene in the cleaned cylinder. The cylinder was previously acid-cleaned to remove any traces of organics and detergents that could interfere with the dispersion tests.

Exactly $0.5000 \pm 0.0005$ gm of colloid inorganic powder is dropped in the solution, with rapid small additions. The cylinder is stoppered, and total volume of solids and liquids recorded. The initial volume of solids is also recorded, if visible. The cylinder is vigorously shaken for 2 minutes by hand, and then allowed to settle at room temperature undisturbed. The rate of sedimentation is recorded by measuring the level of the solid/liquid interface as a function of time. In poorly dispersed systems this rate is very rapid and difficult to measure in the first minutes as a result of adhesion of solids to the glass walls. In well dispersed systems the sedimentation rate is slower and often characterized by descent of a smooth column of non-adhering solids. The final sediment volume is the measure of the solid-liquid interface after it achieves a stable level. In poorly dispersed systems this stable level is achieved within 2-3 hours, with minimal change from 2-12 hours. In highly dispersed systems this level is observed to continue compacting for up to 12 hours.

EXAMPLE 1

Rate of Sedimentation of SiC in Toluene

Figure 1:
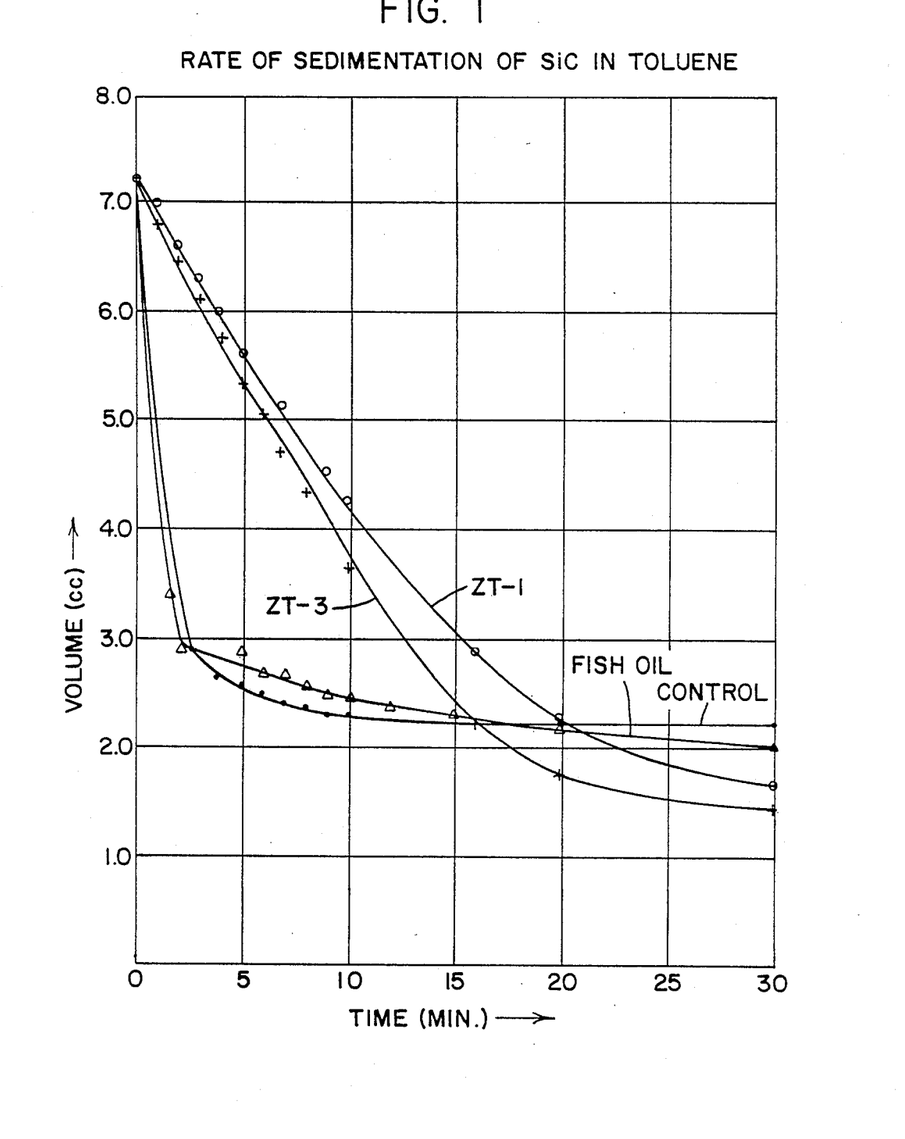
FIGS. 1 to 6 are graphical representations of the results obtained by the practice of the claimed invention.

In this experiment, three "ZT" dispersant used in the practice of the present invention containing different head groups and/or made by different procedures are tested at 1 wt %/SiC against a blank control and two commercial dispersants, Fish Oil and LB-2155. The results are shown in FIG. 1. FIG. 1 is a graph plotting the rate of sedimentation of SiC over time. As shown in this figure, the "ZT" dispersants form more highly dispersed slurries in a very short time (2 min. shaking), as evidenced by the slower sedimentation rate. After 30 min., the trend is for a more compact ceramic from the "ZT" dispersants.

Comparison of SiC Sediment Volumes

Data on stable sediment volumes are recorded in Table 1 (below). A lower SiC volume was achieved for all dispersants vs. untreated control. Of the two commercial dispersants, LB-2155 was slightly better. All three "ZT" dispersants produced extremely tight, high density sediments superior to control and commercial dispersants This indicates formation of a highly-ordered sediment microstructure, which reduces defects in a finished fired ceramic.

TABLE 1

Dispersion of Colloidal SiC in Toluene: Comparison of Sediment Volumes

| Test Sample | Final Sediment Volume, cc |
|---|---|
| 1. Blank Control | 2.14 patchy loose sed. |
| 2. Fish Oil | 1.90 patchy loose sed. |
| 3. LB-2155 | 1.56 grainy sed. |
| 4. ZT-1 ™ | 0.90 ⎫ |
| 5. ZT-2 ™ | 0.75 ⎬ smooth light gray sediment |
| 6. ZT-3 ™ | 0.85 ⎭ |

2. (Fish Oil) and 3. (LB-2155) are two commercial dispersants reported as effective for SiC.

4. ZT-1 ™ has structure $(C_8)C_{10} \overset{+}{N} (Me)-CH_2-CH-CH_2-SO_3^-$
                                                    $|$
                                                   $OH$ 5. ZT-2 ™ has structure $(C_{10})_2 \overset{+}{N} (Me)-CH_2-COO^-$ 6. ZT-3 ™ has same structure as ZT-2 but was isolated from a different reaction type.

All dispersants were tested at 1.0 wt. % with respect to wt. SiC in a solution of 7.0 cc toluene.

EXAMPLE 2

Rate of Sedimentation of AlN in Toluene

Figure 2:
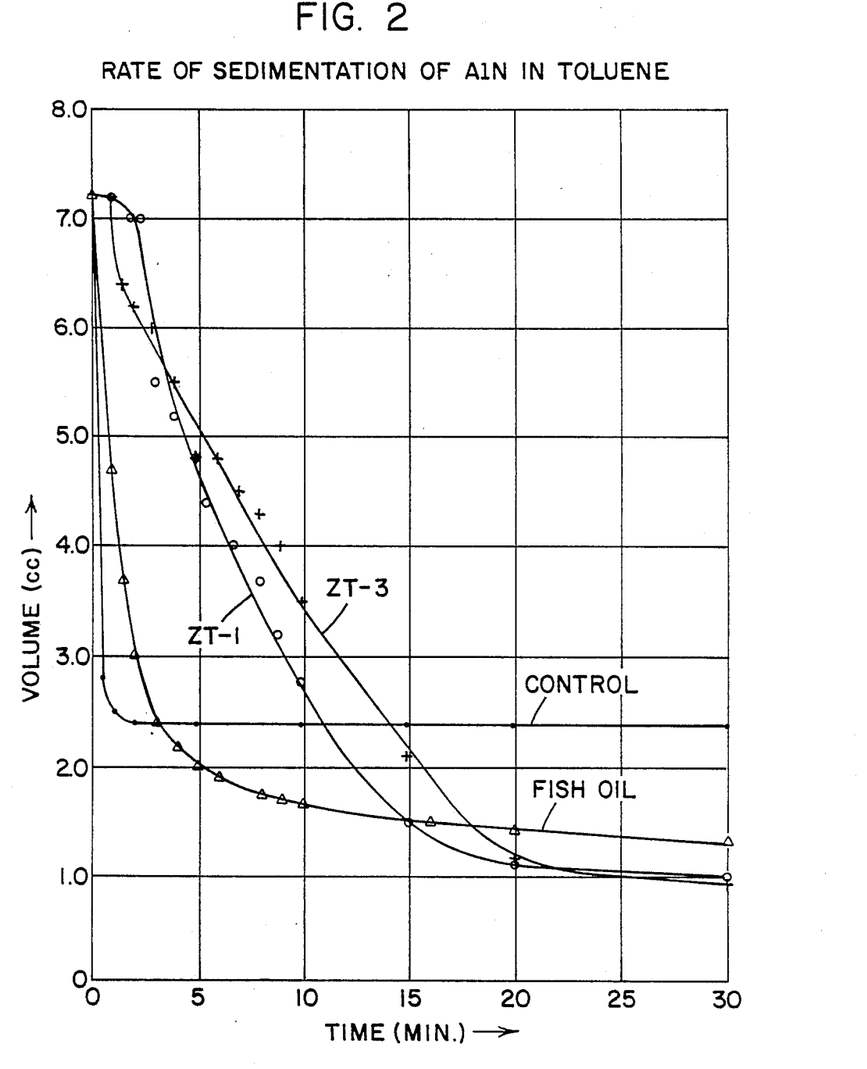

This experiment compared the efficacy of the "ZT" dispersants used in the practice of the present invention on a different inorganic colloid material, aluminum nitride (AlN). As in Example 1, the "ZT" dispersants used in the present invention showed superior performance, as shown in the graph set forth in FIG. 2.

Comparison of AlN Sediment Volumes

Final sediment volumes are recorded for various dispersants of AlN in toluene and are set forth below in Table 2. Again, more highly dense and ordered sediments were obtained with the "ZT's" dispersants used in the present invention than with blank control fish oil and corn oil.

TABLE 2

Dispersion of Colloidal AlN in Toluene: Comparison of Sediment Volumes

| Test Sample | Final Sediment Volume, cc |
|---|---|
| 1. Blank Control | 2.65 patchy loose sed. |
| 2. Corn Oil | 2.62 patchy loose sed. |
| 3. Fish oil | 1.20 patchy loose sed. |
| 3. LB-2155 | 0.5 ⎫ |
| 4. ZT-1 ™ | 0.7 ⎬ |
| 5. ZT-2 ™ | 0.7 ⎬ smooth light gray sediment |
| 6. ZT-3 ™ | 0.6 ⎭ |

Entries 2, 3 and 4 are commercial dispersants used in ceramics processing.
Entries 5, 6 and 7 are zwitterionic "ZT" compounds having the structure set forth in Table 1. The experimental approximation in measuring small volumes (less than 1 cc) is ± 0.1 cc so that entries 4–7 are in a very close range.
All dispersants were tested at 1.0 wt. % with respect to wt. AlN in a solution of 7.0 cc toluene.

EXAMPLE 3

Effect of "ZT" Dispersant Concentration on Sedimentation

Figure 3:
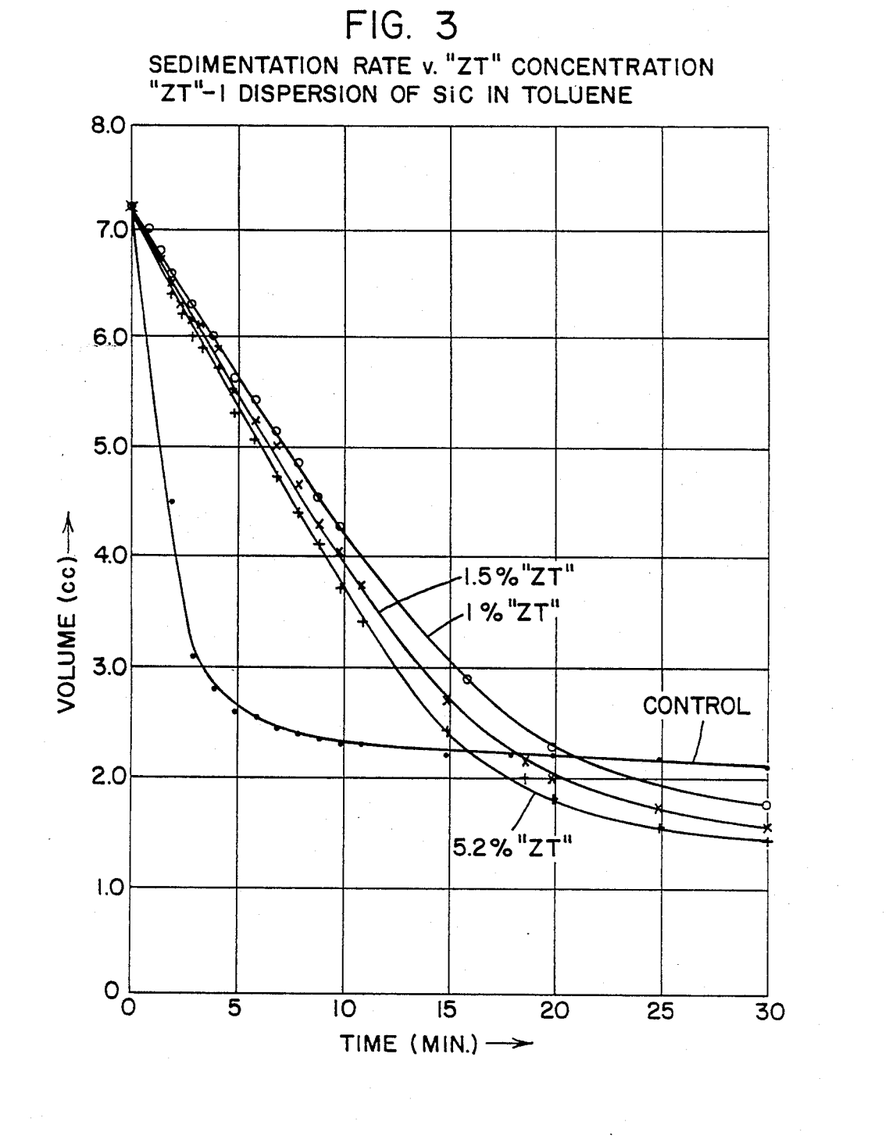

ZT-1 ™ was tested at three dosage levels on a wt. % basis to SiC solid. The samples were prepared by substantially the same general procedure described above. Each sedimentation curve shown graphically in FIG. 3 shows a smooth descent with little scatter. The observed trend is towards slightly improved performance as dosage increases.

The following example is set forth below to illustrate the ability of the casting composition to withstand the presence of water as an impurity.

EXAMPLE 4

Three samples were prepared according to the following procedure. A control sample was prepared by mixing 0.5g SiC in 7cc toluene with no dispersing agent. A second sample was prepared similarly to the control except that 2 wt. % LB-2155 was added. A third sample was prepared similarly to the control using a dispersing agent having the formula $(C_8)(C_{10})N^+(Me)CH_2CH(OH)CH_2SO_3^{31}$ and designated ZT-1 ™. To each of the previously dispersed samples 2μl aliquot portions of $H_2O$ were added and the dispersion shaken for about 2 minutes. The sedimentation rate and final sediment volume was recorded. The procedure was repeated with increasing addition of $H_2O$ up to 100 μl.

Figure 4A:
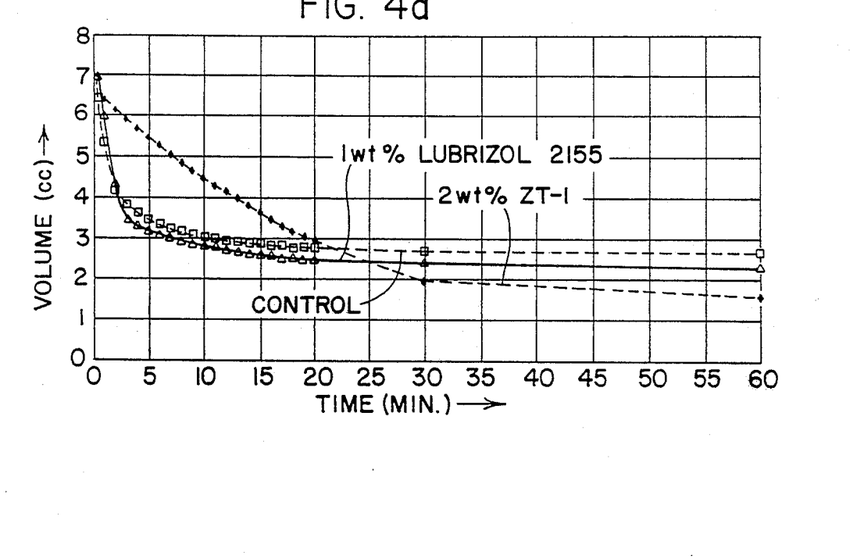
Figure 4B:
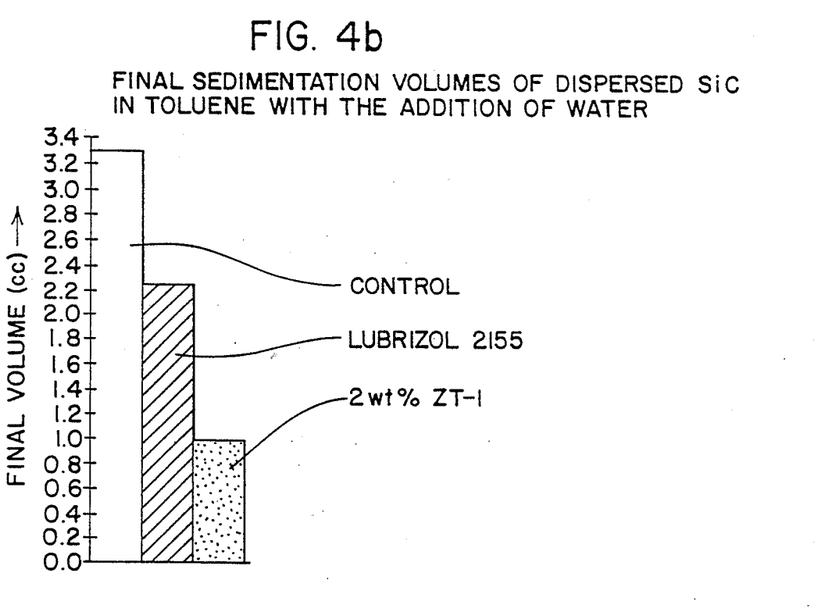

FIG. 4 (a) and (b) depicts the results of this experiment graphically. FIG. 4 (a) plots change in volume for each sample vs. time. The results shows that flocculation caused fast sedimentation rates with the control sample and the LB-2155 sample compared with the casting composition of the present invention. FIG. 4 (b) illustrates by the bar graph that the final sedimentation volume of the inorganic particles dispersed in the casting composition of the present invention is approximately 1 cc compared to over 2 or 3cc for known commercial products leading to poor low density compacts. These results demonstrate that casting composition of the present invention maintained a smooth settling rate and high density compaction.

EXAMPLE 5

This experiment was directed to a comparison of the sedimentation rate and compaction volume of casting composition of the present invention versus a blank control where a mixture of inorganic particulate materials are utilized.

Figure 5:
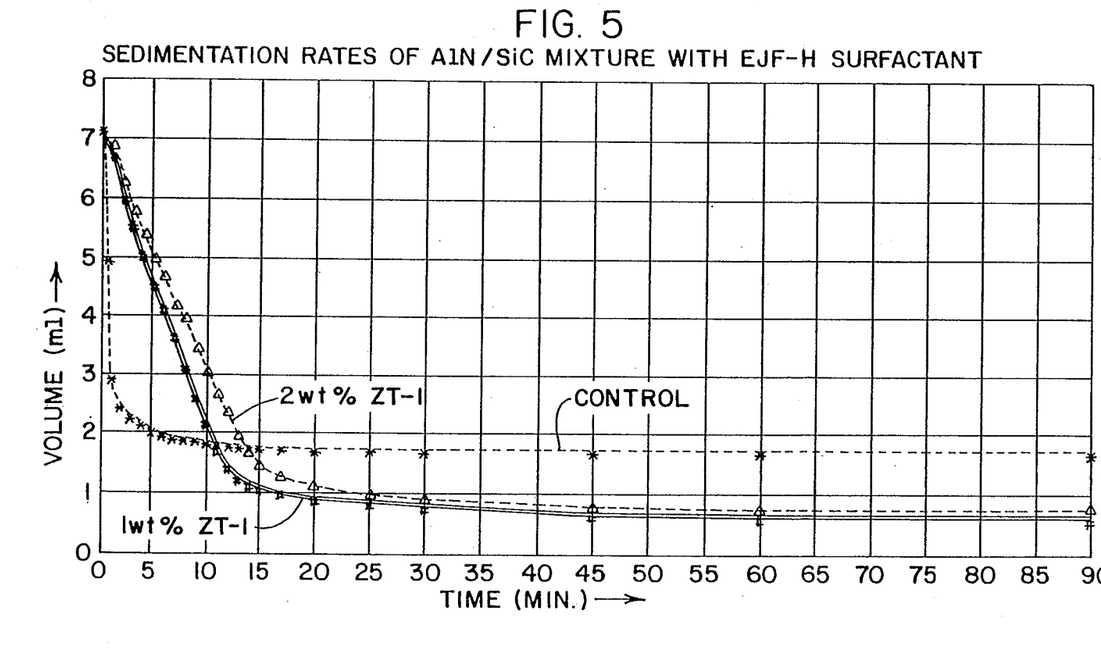
Figure 6:
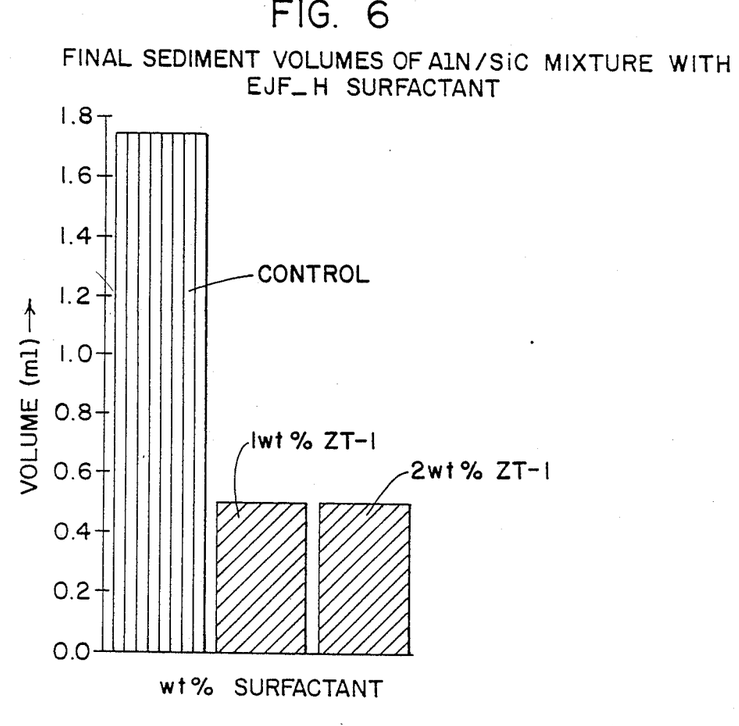

The casting compositions are prepared according to the general procedure outlined previously except that 0.25 gm SiC and 0.25 gm AlN were utilized. The results obtained are illustrated in the graphs set forth in FIGS. 5 and 6. The graph dramatically demonstrated the effect that the dispersing agent ZT-1 ™ has on sedimentation time (i.e. higher dispersed slurry resulting in a slow sedimentation time) and final compact volume (more compact ceramic) for the casting composition.

The foregoing description has been provided for purposes of illustration and description. It is not intended to be exhaustive or to limit the invention to the precise form disclosed and obviously many modifications and variations are possible in light of the above teaching. The embodiments were chosen and described in order to best explain the principles of the invention and its practical application. It is intended that the scope of the invention be defined by the claims appended hereto

What is claimed is:

1. A process for preparing a finished ceramic article comprising:
   (a) apply a slip composition comprising a mixture of inorganic particulate material, an organic solvent and a dispersant for said particulate material having the structure set forth below:

where $R_1$, $R_2$, $R_3$ are linear or branched hydrocarbon chains, where no more than one of the R groups is $CH_3$ and the remaining R groups are each at least 6 to 30 carbon atoms long;

Y is selected from the group consisting of $(CH_2)_n$ where n=1 to 10 and where m=1 to 5; and X is selected from the group consisting of $COO^{31}$, $SO_3^-$, $PO_3^=$ to a substrate;

(b) drying said slip composition to remove said organic solvent to produce a dried unfired ceramic film on said substate;

(c) removing said dried film from said substrate; and (d) firing said dried film at an elevated temperature to produce the finished ceramic article.

2. The process of claim 1 wherein said substrate is a carrier film.

3. The process of claim 2 where said slip composition applied to said carrier film is leveled to produce a thin film by means of a doctor blade prior to drying.

* * * * *

UNITED STATES PATENT AND TRADEMARK OFFICE
CERTIFICATE OF CORRECTION

PATENT NO. : 4,917,842
DATED : April 17, 1990
INVENTOR(S) : Currie et al.

It is certified that error appears in the above-identified patent and that said Letters Patent is hereby corrected as shown below:

Column 1, line 42, should include --.-- following "agent". Column 2, line 3, should include -- vehicle -- following "or". Column 3, line 36, "$PO_3 50$" should read -- $PO_3^=$ --. Column 4, line 51, "Z" should read -- 2 --. Column 6, line 65 should include -- . -- following "dispersants". Column 7, Table 2, that portion reading

| | | | |
|---|---|---|---|
| 3. LB-2155 | | 4. LB-2155 | |
| 4. ZT-1 TM | should read | 5. ZT-1 TM | |
| 5. ZT-2 TM | | 6. ZT-2 TM | |
| 6. ZT-3 TM | | 7. ZT-3 TM | |

Column 8, line 11, that portion of the formula reading "$SO_3^{31}$" should read -- $SO_3^-$ --. Column 8, line 20, "shows" should be -- show --. Column 10, line 7, "$COO^{31}$" should read -- $COO^-$ --.

Signed and Sealed this

Tenth Day of September, 1991

Attest:

HARRY F. MANBECK, JR.

Attesting Officer

Commissioner of Patents and Trademarks